United States Patent [19]
Tichy

[11] Patent Number: 5,517,574
[45] Date of Patent: May 14, 1996

[54] DUAL FUNCTION TRANSDUCER HOUSING

[75] Inventor: Thomas H. Tichy, Albuquerque, N.M.

[73] Assignee: Motorola, Inc., Schaumburg, Ill.

[21] Appl. No.: 361,630

[22] Filed: Dec. 22, 1994

[51] Int. Cl.⁶ ................................................. H04R 25/00
[52] U.S. Cl. .......................................... 381/188; 381/205
[58] Field of Search ................................... 381/188, 192,
381/205, 190, 203, 202, 186, 182; 379/433,
434, 428, 429; 340/384.1, 384.6, 384.73,
388.1, 825.46

[56] References Cited

U.S. PATENT DOCUMENTS

| | | | |
|---|---|---|---|
| 4,720,868 | 1/1988 | Hirano | 381/182 |
| 4,908,601 | 3/1990 | Howze | 340/388.1 |
| 5,172,092 | 12/1992 | Nguyen et al. | 340/384.73 |
| 5,218,337 | 6/1993 | Peter | 381/188 |
| 5,253,301 | 10/1993 | Sakamoto et al. | 381/205 |
| 5,327,120 | 7/1994 | McKee et al. | 340/825.46 |
| 5,388,162 | 2/1995 | Sohn | 381/205 |

*Primary Examiner*—Curtis Kuntz
*Assistant Examiner*—Vivian W. Chang
*Attorney, Agent, or Firm*—Gary J. Cunningham

[57] ABSTRACT

A dual function transducer housing (100), includes a narrow profile housing having top and bottom cavities (105, 103) and a ringer side port (106). The top and bottom cavities (105, 103) are adapted to receive a ringer diaphragm and a speaker diaphragm, respectively. The top cavity (105) is in communication with the ringer side port (106). A ringer output signal is providable through the ringer side port (106) and a speaker output is providable from the housing (100).

20 Claims, 3 Drawing Sheets

DUAL FUNCTION TRANSDUCER HOUSING

FIELD OF THE INVENTION

This invention relates generally to transducers, and in particular, to a dual function transducer housing.

BACKGROUND OF THE INVENTION

Piezoelectric audio transducers are known in the industry, and generally comprise a piezoelectric wafer bonded to a metallic element creating a diaphragm and a supporting structure. Typically, such a transducer has the diaphragm attached to a housing at the periphery of the diaphragm to provide suitable mechanical support and to create the proper acoustical environment. With such a structure, the piezoelectric diaphragm vibrates when it receives an electrical stimulus. This vibration creates a sound pressure within the housing such that the transducer renders the electrical stimulus into an audible signal.

For use in electronic devices, the size of the transducer housing becomes important as the trend is toward miniaturization. Present cellular telephone designs incorporate separate transducers to perform the ringer and speaker functions. Each transducer consists of a diaphragm enclosed within its own housing assembly. Consequently, each transducer must have its own connection and mounting hardware. Also, each transducer must be independently assembled. During the manufacturing process, this can result in additional time, production steps, and parts per telephone.

A transducer housing which is lighter in weight, occupies less volume, costs less, and requires fewer parts and production steps would be an improvement over the prior art.

DESCRIPTION OF A PREFERRED EMBODIMENT

Figure 1:
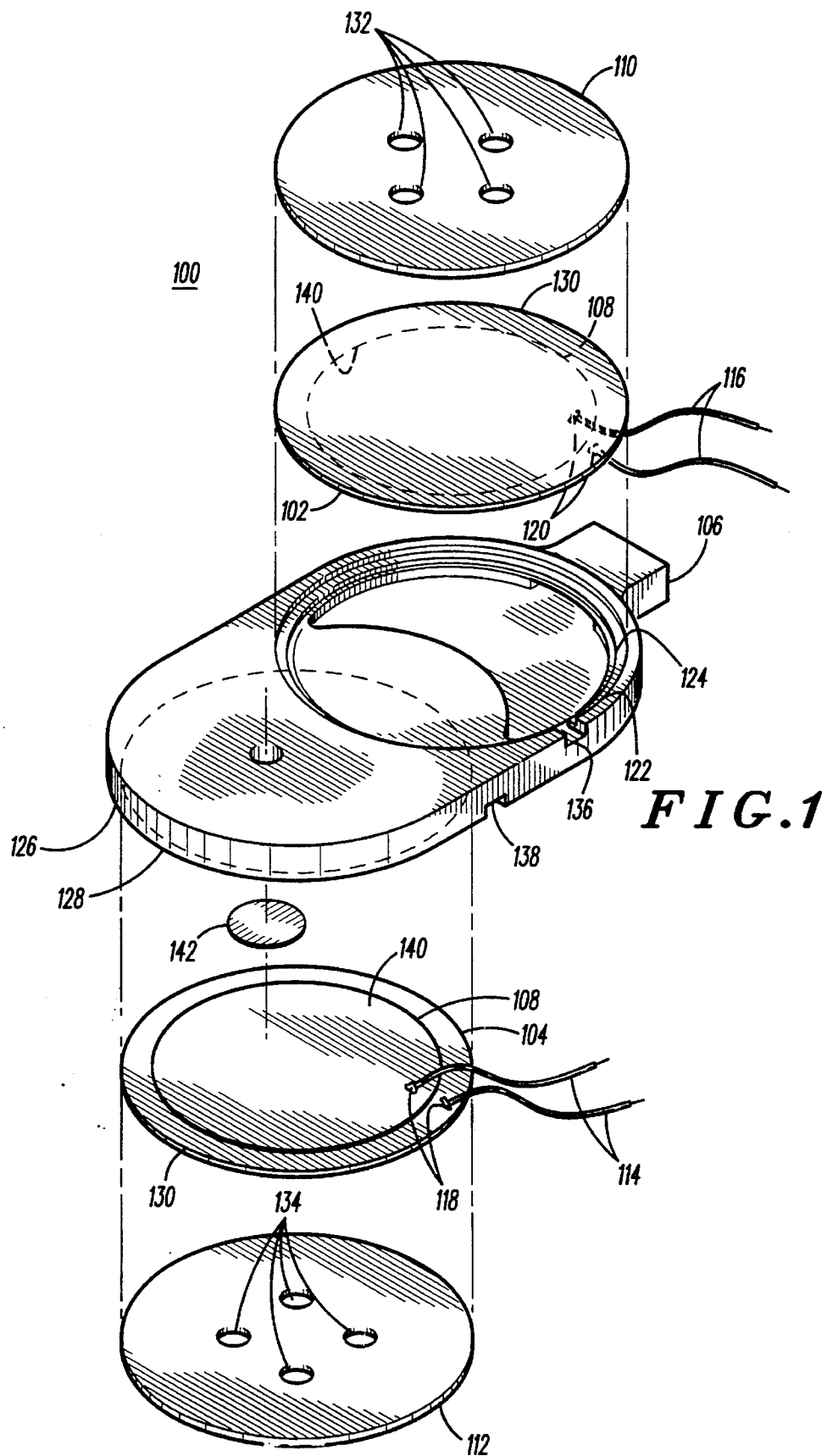
FIG. 1 shows an isometric view of a dual function transducer housing, in accordance with the present invention.
Figure 2:
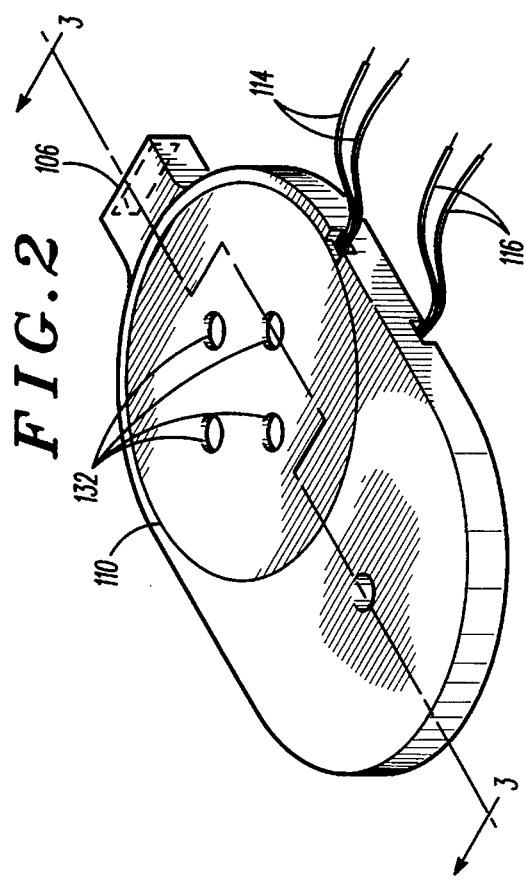
FIG. 2 shows another isometric view of the dual function transducer housing shown in FIG. 1, with the housing completely assembled, in accordance with the present invention.
Figure 3:
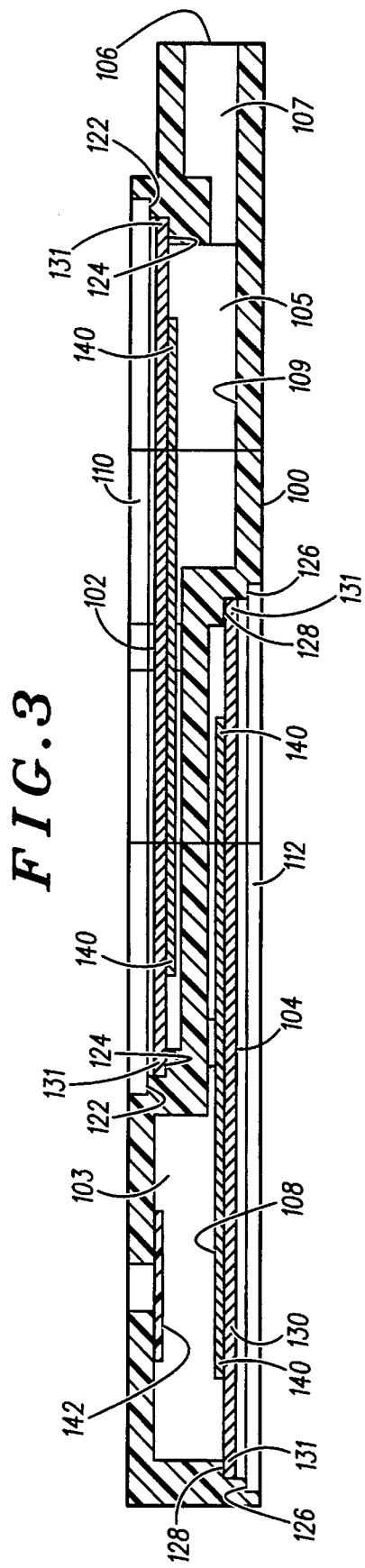
FIG. 3 shows a cross-sectional view along a center longitudinal axis along line 3—3 in FIG. 2, of the dual function transducer housing, in accordance with the present invention.

In its simplest form, the present invention provides a dual-function transducer housing as shown in FIGS. 1–3 as item (100). The housing (100) includes a substantially narrow profile having at least partially off-set top and bottom cavities (receptacles) (105, 103) and a ringer side port (106), the top and bottom cavities (105, 103) being adapted to receive a ringer diaphragm (102) and a speaker diaphragm (104), respectively. The top cavity (105) is in communication with the ringer side port (106) via channel (107), whereby a ringer output signal is providable through the ringer side port (106) and whereby a speaker output is providable away from the housing (100).

In a preferred embodiment, the top cavity (105) includes a complementarily configured ringer diaphragm (102) and likewise, the bottom cavity (103) includes a complementarily configured speaker diaphragm (104). A deep or bottom portion (109) of the cavity (105) between the ringer diaphragm (102) and the ringer side port (106) provides a predetermined air volume, whereby upon activation the ringer output has a predetermined frequency response. Also in a preferred embodiment, the top and bottom cavities (105, 103) include complementarily configured ringer cover (110) having at least one port (132) and a speaker cover (112) having at least one port (134), for providing a relief port and sound output ports, respectively.

The present invention provides a compact and narrow profile housing, which is particularly adapted for portable electronic devices, such as cellular phones, two-way phones, pagers, personal communication devices and the like.

The present invention provides a dual function transducer housing which can be operated as both a ringer and a speaker. It is lightweight, narrow in profile occupying a small volume and costs less than two separate transducers. This may be accomplished by a unique, narrow profile housing design which preferably has offset openings on each side for receipt of transducers in a common housing.

Advantageously, the cavities (103, 105) are partially offset to provide a narrow profile for many electronic applications, and particularly in cellular phones and the like. Consequently, in a preferred embodiment, two separate transducers can to be offset, and still provide a sufficiently narrow profile while maintaining the correct acoustical volume. Thus, notwithstanding their close proximity, the ringer transducer and the speaker transducer are both acoustically and electrically isolated.

The extent to which the top and bottom cavities (105, 103) are offset in the dual function transducer housing (100), can vary greatly. In a preferred embodiment, the top and bottom cavities are at least partially offset. However, the extent to which they are offset can be altered to accommodate different design criteria. Nevertheless, any configuration which provides a narrow profile and places the ringer diaphragm opposite the speaker diaphragm, as detailed herein, would be considered within the teachings of the present invention.

In more detail, FIG. 1 shows a ringer diaphragm (102) which rests inside the cavity (105) on a top surface of the housing assembly. A speaker diaphragm (104) rests on the opposite side of the housing assembly inside a cavity (103) on the bottom surface. The top of the transducer housing (100) is complimentary configured to receive the ringer diaphragm (102) and the bottom of the transducer housing (100) is complimentary figured to receive the speaker diaphragm (104). The housing (100) can be made in various ways, and preferably is injection molded, for minimal costs, ease of mass production and minimal tooling requirements. Thus, an injection molded plastic is preferred, to provide a high modulus of elasticity making it resilient and stiff for improved acoustic isolation.

A side port (106) for the ringer output signal (106) is located at one end of the transducer housing (100) close to the ringer diaphragm (102). In order for the ringer transducer to generate a desired signal, a predetermined air volume in proximity to a bottom portion (109) of the top cavity (105) between the ringer diaphragm (102) and the transducer housing (100) is compared with the air volume in proximity to a channel area (107) in proximity to and upstream of the ringer side port (106), as shown in FIG. 3. The ratio of these two volumes in proximity to bottom (innermost) portion (109) and channel area (107) provide the desired ringer output with a predetermined frequency response. Preferably, this structure produces a desired ratio substantially providing a Helmholtz Resonator.

The ringer diaphragm (102) comprises a metallic element (130) which is bonded with a ceramic wafer element (108) (hereafter referred to as piezoelectric wafer or ceramic wafer element), by means of an adhesive in proximity to and within an outer portion (140) of the ceramic element (108). The piezoelectric wafer (108) and the metallic element (130) together form the ringer diaphragm (102).

In one embodiment, the diaphragms (102, 104) can include conductive inwardly extending flanges around their outer peripheries (131), for improving the placement of the diaphragms (102, 104) in the transducer housing (100), by controlling the location of the adhesive which bonds the diaphragms (102, 104) to the housing. In one embodiment, an adhesive is applied solely around the outer peripheries (131) of the diaphragms (102, 104), thereby minimizing the possibility of the adhesive spreading onto other sensitive surfaces of the diaphragm. With this structure, the mechanical bending characteristics of the diaphragms are maintained.

In one embodiment, the ceramic wafers (108) are not polarized when initially manufactured. In use, when an electric field is applied to the ceramic, the material becomes electrically polarized and thereafter behaves as a piezoelectric or "PZT" material. When a PZT material is bonded to a relatively rigid backing plate such as the metallic element (130), the PZT material will expand and contract upon the application of an electric field. Although the ceramic wafer's diameter and thickness are changing in response to an electrical stimulus, the metallic element (130) remains substantially constant in the presence of the electrical stimulus. As a result, when the ceramic wafer (108) increases in diameter, the internal mechanical stresses actually cause the diaphragm to bend. The bending of the diaphragm produces a desired frequency response of the transducer. The deformation characteristics of a PZT element in response to an applied electric field permits its use as a transducer in electronic applications.

The ringer diaphragm (102) is placed into a receptacle or cavity (105) of the transducer housing (100) and rests on a lip or lower annular step portion (124), which is configured and molded into the housing (100) itself. On the opposite side of the housing (100), the speaker diaphragm (104) also includes a metallic element (130) which is bonded to a piezoelectric wafer (108) by means of an adhesive in proximity to an outer periphery (140). The speaker diaphragm (104) also rests on a lower lip (128) of the bottom cavity (or receptacle) (103), which is formed in the housing (100), as shown in FIG. 3.

The speaker and ringer diaphragms (104, 102) may be of a bimorph or monomorph construction, preferably monomorph for ease of manufacture, low costs and narrow profile. Whereas a monomorph has a ceramic wafer attached to one side of the metallic element, a bimorph has ceramic elements present on both sides of the metallic element. When the diaphragm is of a monomorph construction, the transducer housing (100) may be designed to include electrical connections to the diaphragm without the need for lead wires or soldering. However, if a bimorph construction is employed, the mechanical complexity will be increased because the electrical connections will need to be connected to the center of the bimorph. As should be understood by those skilled in the art, monomorph, bimorph or multi-morph constructions, and even magnetic speakers, can be employed in accordance with the teachings of this invention.

As shown in FIG. 1, the ringer diaphragm (102) and the speaker diaphragm (104) are protected by a ringer diaphragm cover (110) and a speaker diaphragm cover (112), respectively. As best shown in FIGS. 2 and 3, the transducer housing (100) when assembled, includes these protective covers (110 and 112), which are complementarily configured to be received and fit in cavities (105, 103) of the transducer housing (102), forming a smooth exterior surface and a narrow overall profile. Thus, the covers (110, 112) protect the diaphragms (102, 104) from being damaged, thereby providing mechanical protection while also being substantially acoustically transparent.

By controlling the volume of air and spacing between the diaphragm elements (102, 104) and the interior surface of the cavities (105, 103) of the transducer housing (100), a desired output can be obtained. As should be understood by those skilled in the art, various spacings and cavity volumes can be used to achieve a desired output adapted to a desired application.

As shown in FIG. 3, the diaphragm covers (110, 112) rest on upper-annular lips or steps (122, 126) of the transducer housing (100). As shown in the figures, the diaphragm covers (110, 112) each have a plurality of ports, preferably four small diameter holes equi-spaced and located in proximity to the center areas which serve important functions. The holes (132) in FIG. 1, on the ringer diaphragm cover (110) serve as relief holes. These holes (132) have a sufficiently large diameter so as not to impede the flow of air through the diaphragm cover (110). The holes (134) on the speaker diaphragm cover (112) serve as sound outlet holes. The covers (110, 112) can be suitably snap-fit connected or preferably adhesively connected to the housing (100), for example, at steps (122, 126).

The present invention can be adapted to provide a variety of electrical contact configurations. For example, one embodiment may incorporate tabs into the design of the transducer housing (100) to form an electrical contact. These tabs may be attached to both sides of the speaker and ringer covers (110, 112) as well as to the speaker and ringer diaphragms (102, 104). The tabs may attach these components to the transducer housing (100), thereby securing the diaphragms in place by mechanical means and providing an electrical connection from the transducer to a circuit board.

Another variation could include surface mountable conductive tabs using conventional surface mount technology. In this embodiment, in lieu of electrical lead wires, other adjustments would be made to the design of the transducer housing (100). For example, a thin channel would be included in the side of the transducer housing to facilitate the introduction of connector pins which would complete the electrical connection. Also, a series of outwardly extending contacts would be built into the side of the transducer housing (100). In any event, these designs are considered within the teachings of the present invention.

As best shown in FIGS. 1 and 2, feed-through notches (136, 138) are utilized and formed on a side surface of the transducer housing (100). Each of the diaphragms (102, 104) are electrically connected to external electrical circuitry, such as telephone circuitry, by means of electrical lead wires (114, 116). The wires (114, 116) can be soldered onto the diaphragms forming electrical contacts (118, 120). The feed through notches (136, 138) are formed in the transducer housing (100) to allow the lead wires to enter the housing without adversely effecting the performance of the transducer, and contributing to a narrow overall housing profile.

An acoustic damping mechanism, such as a cloth dampener (142) shown in FIGS. 1 and 2, is suitably placed in an interior bottom portion of the bottom cavity (103) of the transducer housing (100). In a preferred embodiment, the damping cloth (142) is provided to insure the proper operation of the speaker transducer. The dampening cloth (142) is used to control the response frequency of the speaker diaphragm (102), by controlling the compliance of the air cavity formed by the diaphragm (102) and the transducer housing (100).

Figure 4:
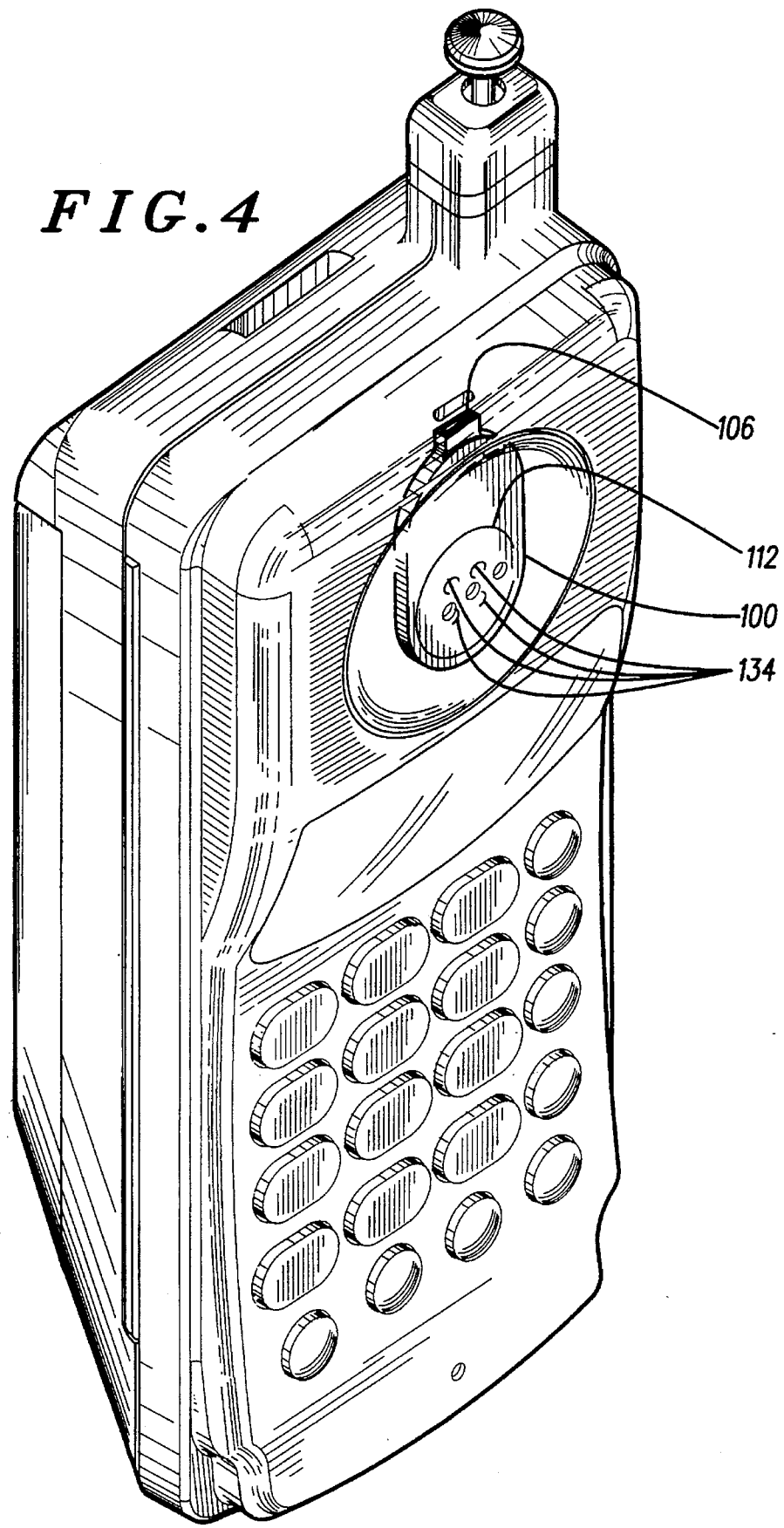
FIG. 4 shows a view of the placement of a dual function transducer housing inside a cellular telephone, in accordance with the present invention.

FIG. 4 shows the placement of the transducer housing (100) inside a cellular telephone. From this view, it can be seen that the speaker diaphragm (104) faces the front of the telephone while the ringer diaphragm (102) faces the rear of the telephone, with the ringer output signal port (106) pointed upwardly. Advantageously, the speaker diaphragm is aligned with and in proximity to the earpiece of the phone, and the ringer output port (106) with the ring output port of the phone. The compact and narrow profile design of the present invention, provides additional useful space inside the telephone for other circuitry, or the overall geometry of the phone can be reduced for example, if desired.

Although various embodiments of this invention have been shown and described, it should be understood that various modifications and substitutions, as well as rearrangements and combinations of the preceding embodiments, can be made by those skilled in the art, without departing from the novel spirit and scope of this invention.

What is claimed is:

1. A dual function transducer housing, comprising:
   a substantially narrow profile housing having at least partially, axially off-set top and bottom cavities, and a ringer side port;
   the top and bottom cavities being adapted to receive a ringer diaphragm and a speaker diaphragm, respectively, the top cavity is in communication with the ringer side port, whereby a ringer output signal is providable through the ringer side port and whereby a speaker output is providable from the housing.

2. The transducer housing of claim 1, wherein the top cavity includes a complimentary configured ringer diaphragm and the bottom cavity includes a complimentary configured speaker diaphragm.

3. The transducer housing of claim 2, wherein the top cavity includes a deep section area substantially between the ringer diaphragm and the ringer side port defining a predetermined air volume, whereby upon activation the ringer output has a predetermined frequency response.

4. The transducer housing in claim 1, wherein the top and bottom cavities are covered by a ringer cover having at least one port and a speaker cover having at least one port, respectively.

5. A dual function transducer housing, comprising:
   a housing having at least partially, axially off-set top and bottom cavities, and a ringer side port;
   a ringer diaphragm substantially received in the top cavity of the housing whereby upon activation a ringer output signal is provided through the ringer side port; and
   a speaker diaphragm substantially received in the bottom cavity of the housing, whereby upon activation a speaker output is provided away from the speaker diaphragm.

6. The transducer housing of claim 5, wherein the housing comprises an injection molded material.

7. The transducer housing of claim 5, wherein the housing includes a substantially narrow profile, and is adapted for use in at least one of a telephone, pager and personal communicating device.

8. The transducer housing of claim 5, wherein the top and bottom cavities are complimentary configured to receive the ringer and speaker diaphragms.

9. The transducer housing of claim 5, wherein the speaker diaphragm and a deep top portion of the bottom cavity are suitably spaced and define a predetermined air volume for a desired frequency response.

10. The transducer housing of claim 5, wherein a bottom area of the top cavity between the ringer diaphragm and the ringer side port defines a predetermined air volume, whereby upon activation, the ringer output has a desired frequency response.

11. The transducer housing of claim 5, wherein the ringer diaphragm and the speaker diaphragm include a piezoelectric ceramic wafer element and a metallic element which together form a ringer transducer and speaker transducer, respectively.

12. The transducer housing of claim 11, wherein both transducers include an inwardly-extending flange around an outer periphery, for improved mounting in the housing and providing a predetermined resonant frequency by maintaining a desired mechanical integrity of the ringer and speaker diaphragms.

13. The transducer housing of claim 12, wherein the housing has annular notches adapted to receive the flange of the ringer and the speaker diaphragms.

14. The transducer housing of claim 5, wherein the top and bottom cavities are adapted to receive at least one of a monomorph diaphragm structure, a bimorph diaphragm structure, and a magnetic speaker.

15. The transducer housing of claim 5, wherein the top and bottom cavities include a ringer cover having at least one relief port and a speaker cover having at least one sound output port, respectively.

16. The transducer housing of claim 11, wherein a ringer cover connected to the top cavity is configured to substantially constrict the movement of the ringer transducer.

17. The transducer housing of claim 5, wherein an interior top section of the bottom cavity has an opening, including an acoustic damping mechanism adjacent to and covering the opening, for providing a certain frequency response.

18. The transducer housing of claim 5, wherein the housing has at least one side port adapted to receive at least one of outwardly extending contacts and lead wires, for providing electrical signals into and out of the housing.

19. The transducer housing of claim 18, wherein the contacts are reflowable and surface mountable to a circuit board, defining a surface mountable housing.

20. The transducer housing of claim 11, wherein the housing has a plurality of side notches providing feedthroughs for at least two pairs of lead wires which form electrical contacts with the ceramic wafer element and the metallic element of the speaker and ringer diaphragms, respectively.

* * * * *